(12) United States Patent
Jayanetti et al.

(10) Patent No.: US 8,732,974 B2
(45) Date of Patent: May 27, 2014

(54) DIMENSIONING ACCESSORY FOR MOBILE DEVICE

(75) Inventors: Ruwan Jayanetti, Nugegoda (LK); Subramanian K (Ks), Bangalore (IN); Viputa Liyanaarachchi, Battaramulla (LK)

(73) Assignee: Symbol Technologies, Inc., Holtsville, NY (US)

( * ) Notice: Subject to any disclaimer, the term of this patent is extended or adjusted under 35 U.S.C. 154(b) by 189 days.

(21) Appl. No.: 13/472,805

(22) Filed: May 16, 2012

(65) Prior Publication Data

US 2013/0305551 A1    Nov. 21, 2013

(51) Int. Cl.
*G01B 3/10*    (2006.01)

(52) U.S. Cl.
USPC ........................................................... 33/760

(58) Field of Classification Search
USPC .................................... 33/755, 759, 760, 768
See application file for complete search history.

(56) References Cited

U.S. PATENT DOCUMENTS

| | | |
|---|---|---|
| 4,164,816 A | 8/1979 | Bergkvist |
| 4,195,348 A | 3/1980 | Kakutani |
| 4,611,402 A | 9/1986 | Yamamoto |
| 5,426,863 A | 6/1995 | Biggel |
| 5,433,014 A | 7/1995 | Falk et al. |
| 5,894,678 A * | 4/1999 | Masreliez et al. ............... 33/762 |
| 5,983,514 A | 11/1999 | Lindsey |
| 6,658,755 B2 | 12/2003 | Arlinsky |
| 7,363,723 B1 | 4/2008 | Peterson |
| 7,900,369 B2 | 3/2011 | Albrecht |
| 7,963,046 B2 | 6/2011 | Fratti |
| 8,230,610 B2 * | 7/2012 | Jaiswal et al. ............. 33/366.11 |
| 2007/0101600 A1 * | 5/2007 | Alders ............................ 33/760 |
| 2010/0192394 A1 * | 8/2010 | Cheng Tam et al. ............ 33/2 R |
| 2013/0055578 A1 * | 3/2013 | Johns ............................... 33/760 |
| 2013/0126541 A1 * | 5/2013 | Woolery .......................... 33/712 |

OTHER PUBLICATIONS

"Pocket smart string," accessed at http://www.pocketsmartstring.com/, accessed on Sep. 28, 2012, pp. 5.

* cited by examiner

*Primary Examiner* — G. Bradley Bennett

(57) ABSTRACT

A mobile device accessory for measuring a dimension is described. The accessory includes a housing having a mating feature that is adapted to mate with a corresponding mating feature of a mobile device. A measuring tape includes a detectable pattern thereon. The detectable pattern is related to the dimension. The accessory also includes a detector that generates a signal in response to detecting the pattern. A processor generates dimension data in response to receiving the signal. An interface transmits the dimension data to the mobile device.

20 Claims, 3 Drawing Sheets

DIMENSIONING ACCESSORY FOR MOBILE DEVICE

TECHNICAL FIELD

This invention relates generally to measuring a dimension, such as a length, using an accessory coupled to a mobile device.

BACKGROUND

Measuring tapes having digital displays can be advantageous. A display can be relatively easy to read compared with manually reading small markings on a tape. One disadvantage of digital measuring tapes is that they require a battery to power the measuring circuitry and the digital display.

SUMMARY

In one aspect, the invention is embodied in a mobile device for measuring a dimension. The mobile device accessory includes a housing having a mating feature that mates with a corresponding mating feature of a mobile device. A measuring tape includes a detectable pattern thereon. The detectable pattern is related to the dimension. A detector generates a signal in response to detecting the pattern. A processor generates dimension data in response to receiving the signal from the detector. An interface transmits the dimension data to the mobile device.

In one embodiment, the interface includes a radio. In one embodiment, the tape is retractable into a housing of the accessory. A display displays the dimension data. A memory stores the dimension data. A control button can activate the detector. In one embodiment, a mechanical lock secures a position of the measuring tape. A battery can be coupled to the processor. In one embodiment, the interface includes an electrical connector that mates with an electrical connector of the mobile device.

In another aspect, the invention is embodied in a method for measuring a dimension. The method includes positioning a measuring tape having a detectable pattern thereon on an object to be measured. The detectable pattern is related to the dimension. A signal is generated in response to detecting the pattern. The signal is processed to generate dimension data. The dimension data is transmitted to a mobile device.

In one embodiment, the step of transmitting includes wirelessly transmitting the dimension data to the mobile device. The measuring tape can be retracted into a housing. In some embodiments, the dimension data can be stored and/or displayed. The detector is activated for detecting the pattern.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional measuring tapes, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to measuring a dimension using an accessory and transmitting the value of the dimension to a mobile device that is mechanically coupled to the accessory.

The accessory includes a housing that mates with a housing of the mobile device. A measuring tape in the housing includes a detectable pattern formed or printed thereon. The detectable pattern is related to the dimension. The accessory also includes a detector that generates a signal in response to detecting the pattern. A processor generates dimension data in response to receiving the signal. An interface, such as an electrical connector or a radio, transmits the dimension data to the mobile device.

Figure 1:
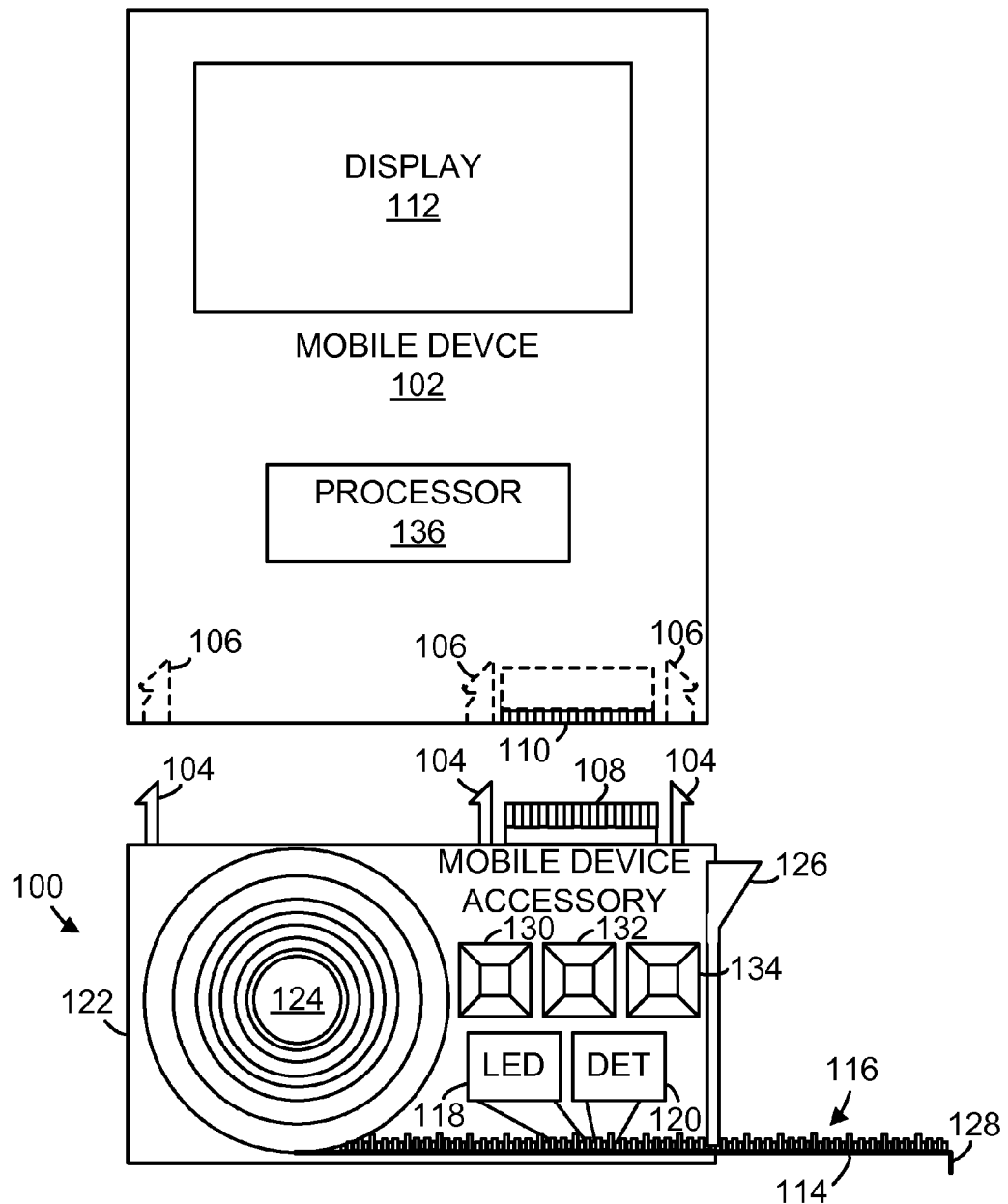
FIG. 1 illustrates a diagram of one embodiment of a mobile device accessory according to the invention.

FIG. 1 illustrates a diagram of one embodiment of a mobile device accessory 100 according to the invention. The accessory 100 can be coupled to a mobile device 102. For example, the mobile device accessory 100 can be mechanically and electrically coupled to the mobile device 102. In one embodiment, the accessory 100 can include latches 104 that mate with recesses 106 in the mobile device 102 to secure the accessory 100 to the mobile device 102. The accessory 100 can include an electrical connector 108 that mates with an electrical connector 110 of the mobile device 102. The electrical connectors 108, 110 can transfer power and data between the accessory 100 and the mobile device 102.

In one embodiment, the accessory 100 can include a power source, such as a battery and a radio, such as a Bluetooth radio, that wirelessly communicates with the mobile device 102. In this embodiment, the connectors 108, 110 are not required since data can be wirelessly transmitted between the accessory 100 and the mobile device 102. In one embodiment, the transmitted data can be displayed on a display 112 of the mobile device 102.

The accessory 100 can include a measuring tape 114. The measuring tape 114 can include a pattern 116 printed thereon. For example, the pattern 116 can include an indicia that can be illuminated by a light emitting diode (LED) 118 and read by a detector 120. In practice, any illumination source can be used, such as a lamp (not shown). The detector 120 can be a camera or an imager, such as a charged coupled device (CCD), for example. The pattern 116 on the tape 114 consists of discrete symbols that can be detected by the detector 120. For example, the discrete symbols can consist of patterns of light and dark lines having various thicknesses. The discrete symbols correspond to different values as the tape 114 is extended. The tape 114 can be calibrated by correlating each value to an actual dimension. A processor (not shown) can calibrate the accessory 100 by using the calibration data. A dimension of an object can then be measured when the tape 114 is extended across the desired dimension of the object.

In an alternate embodiment (not shown), a light-emitting diode (LED) can focus light on a surface of the measuring tape. The light can be reflected from the surface on to a detector, such as a complementary metal-oxide semiconductor (CMOS) sensor. The CMOS sensor can capture many hundreds of images of the reflected light per second. The CMOS sensor sends each image to a digital signal processor (DSP) for analysis. The DSP can detect patterns in the images and see how those patterns have moved since the previous image. Based on the change in patterns over a sequence of images, the DSP can determine the distance in which the measuring tape has moved. In this embodiment, the measuring tape does not require a pattern formed thereon.

In yet another embodiment (not shown), an illumination source can focus a light beam onto a surface of a measuring tape. The surface of the measure tape is highly-reflective and includes a grid pattern of dark lines. As the measuring tape is moved, the light beam is interrupted by one or more of the dark lines of the grid pattern. A sensor can detect when the light beam is interrupted. The sensor sends a signal to a processor that determines the distance the measuring tape moved based on the number of interruptions detected by the sensor. Skilled artisans will appreciate that other suitable detection schemes could also be used.

The measuring tape 114, detector 120 and LED 118 can be positioned in a housing 122. The measuring tape 114 can be configured to retract onto a spool 124 located in the housing 122. A mechanical lock 126 is configured to secure the measuring tape 114 in an extended position. One end of the measuring tape 114 can include a hook 128 for temporarily holding the measuring tape 114 against an object being measured. In one embodiment, the hook 128 can include a bend that is perpendicular to a plane of the measuring tape 114.

One or more switches 130, 132, 134 can be positioned on the housing 122 of the accessory 100. The switches 130, 132, 134 can be operated by a user to activate the accessory 100. For example, the first switch 130 can correspond to a length, the second switch 132 can correspond to a width, and the third switch 134 can correspond to a height.

In one embodiment (not shown), the housing of the accessory 100 can be devoid of switches or controls. In this embodiment, the mobile device 102 can include preexisting switches that control the accessory 100 when the accessory 100 is coupled to the mobile device 102. In another embodiment, the mobile device 102 can include one or more dedicated switches that control the accessory 100 when the accessory 100 is coupled to the mobile device 102.

In one embodiment, the mobile device accessory 100 can include a processor that calculates a volume based on the measurements of the length, width, and height. In another embodiment, the measurements are transmitted to the mobile device 102, and a processor 136 in the mobile device 102 calculates a volume of the measured object.

In operation, a user couples the accessory 100 to the mobile device 102. In one embodiment, the user activates a software program on the mobile device 102 to allow the accessory 100 to communicate with the mobile device 102. In another embodiment, the act of coupling of the accessory 100 to the mobile device 102 causes the mobile device 102 to recognize that the accessory 100 is coupled to the mobile device 100.

The user extends the measuring tape 114 from the housing 122 of the accessory 100 across the object to be measured. The user activates a control switch 130 on the accessory 100 once the measuring tape 114 is extended to the appropriate length. The control switch 130 activates the detector 120 which detects the pattern 116. The detector 120 generates a signal corresponding to the dimension. A processor (not shown) processes the signal to generate dimension data. The dimension data can be transmitted to the mobile device 102 for further processing.

Figure 2:
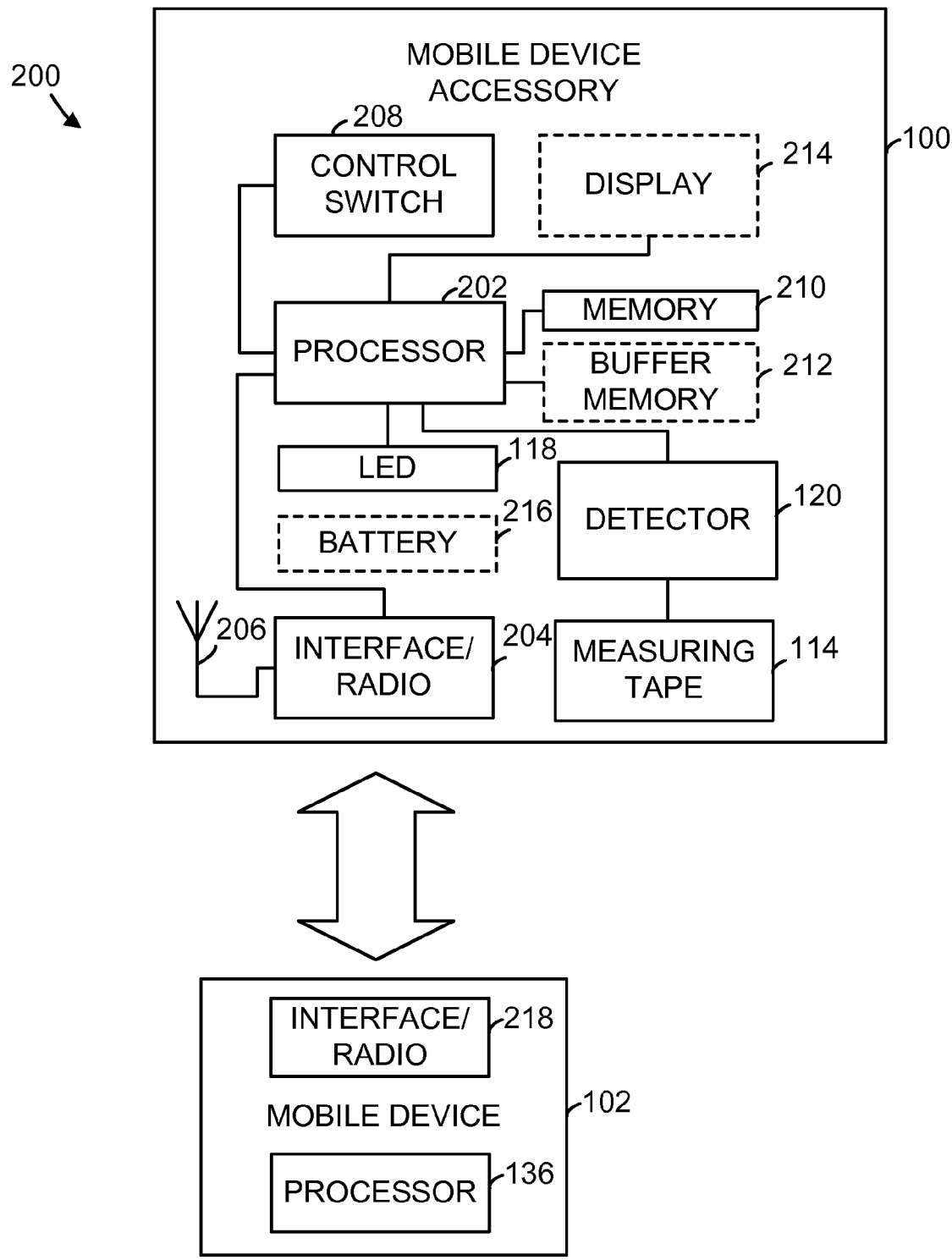
FIG. 2 is a block diagram illustrating the electronic components of the mobile device accessory of FIG. 1 according to the invention.

FIG. 2 is a block diagram 200 illustrating the electronic components of the mobile device accessory 100 of FIG. 1 according to the invention. The mobile device accessory 100 contains, among other components, a processor 202, an interface 204 which can include a radio transceiver including transmitter circuitry and receiver circuitry, an antenna 206, at least one control switch 208, a program memory 210 for storing operating instructions that are executed by the processor 202, an optional buffer memory 212, the detector 120, the light emitting diode (LED) 118, an optional display 214, and an optional battery 216.

The accessory 100 is coupled to a mobile device 102 having a corresponding interface 218. The corresponding interface 218 can include a radio transceiver including transmitter circuitry and receiver circuitry. Alternatively, the interface 218 can include a hard-wired electrical connection between the accessory 100 and the mobile device 102, such as through the connectors 108, 110 (FIG. 1).

The accessory 100 also includes the measuring tape 114. The measuring tape 114 can be fabricated from any suitable material, such as a metal, a fabric, or a plastic material. The measuring tape 114 can include the pattern 116 that is detectable by the detector 120.

The detector 120 can be any device that is capable of reading the pattern 116. For example, the detector 120 can be a photodetector or an imaging sensor. The light emitting diode (LED) 118 is capable of illuminating the pattern 116 on the measuring tape 114. In some embodiments, the LED 118 can be integrated with the detector 120. In practice, any suitable light source can be used.

The accessory 100 can include the processor 202. The processor 202 is capable of decoding signals generated by the detector 120. The processor 202 can include one or more microprocessors, microcontrollers, DSPs, state machines, logic circuitry, or any other device or devices that process information based on operational or programming instructions. Such operational or programming instructions are preferably stored in the memory 210. The memory 210 can be an IC memory chip containing any form of random access memory (RAM) or read only memory (ROM), a flash memory card or any other medium for storing digital information. Skilled artisans will recognize that when the processor 202 has one or more of its functions performed by a state machine or logic circuitry, the memory 210 containing the corresponding operational instructions may be embedded within the state machine or logic circuitry.

The buffer memory 212 can be any form of volatile memory, such as RAM, and is used for temporarily storing information received from the detector 120 or temporarily stored by the processor, for example.

The optional display 214 can display data generated by software applications residing in the memory 210 and executing on the processor 202, such as dimension data received from the detector 120. The display 214 can be a liquid crystal display (LCD) or any other suitable display. In one embodiment, the display 214 is a touch screen display having user input capabilities. For example, the user can touch the surface of the display 214 to activate a function of the accessory 100.

The interface 204 can include a radio to enable the accessory 100 to respectively transmit and receive communication signals. In this regard, the radio includes circuitry to enable wireless transmissions. The implementations of the radio depend on the implementation of the accessory 100 and the mobile device 102 with which it is to communicate. For example, the radio can be implemented as part of the communication device hardware and software architecture in accordance with known techniques. One of ordinary skill in the art will recognize that most, if not all, of the functions of the radio can be implemented in a processor, such as the processor 202. However, the processor 202 and the radio have been partitioned herein to facilitate a better understanding of the functions of these elements. The antenna 206 can be a personal area network (PAN) or a local area network (LAN) antenna coupled to the radio.

Alternatively, the interface 204 can be a hard-wired electrical connection between the accessory 100 and the mobile device 102. The hard-wired electrical connection can transfer power and/or data between the accessory 100 and the mobile device 102.

In one embodiment, the accessory 100 is an integrated unit containing the components depicted in FIG. 2, as well as any other component necessary for the accessory 100 to function. In one embodiment, the electronic components can be connected by a bus (not shown).

Figure 3:
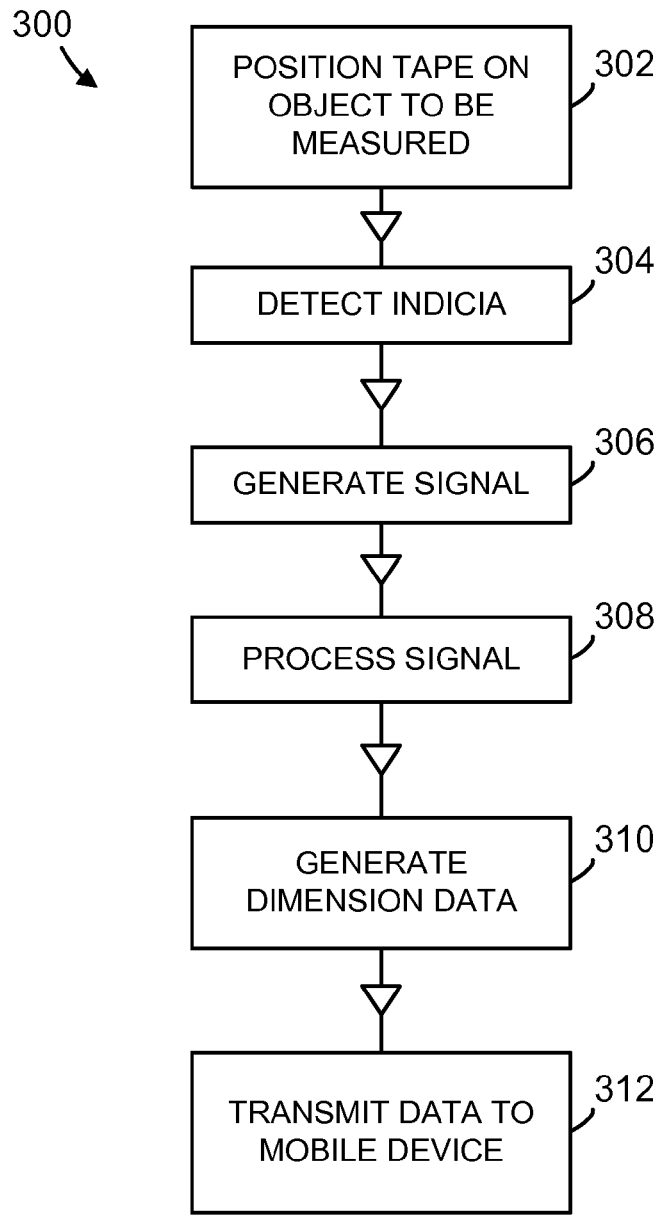
FIG. 3 is a flowchart illustrating one mode of operation of a mobile device accessory in accordance with the invention.

FIG. 3 is a flowchart 300 illustrating one mode of operation of a mobile device accessory 100 in accordance with the invention. In step 302, the measuring tape 114 (FIG. 1) is extended from the housing 122 and positioned on an object to be measured. The measuring tape 114 can be retracted into the housing 122 after use.

The detectable pattern 116 on the measuring tape 114 is detected by the detector 120 (step 304). The detectable pattern 116 is related to a dimension of the object being measured. The detector 120 generates a signal in response to the detected pattern 116 (step 306).

The processor 202 (FIG. 2) processes the signal (step 308) and generates dimension data (step 310). The dimension data is then transmitted to the coupled mobile device 102 for further processing (step 312). In some embodiments, the dimension data can be stored in a memory 210, 212 of the accessory 100 and/or displayed on an optional display 214. The user activates the detector 120 in order for the detector 120 to detect the pattern 116.

The dimension data can be transmitted through a hard-wired connection between the accessory 100 and the mobile device 102, such as through connectors 108, 110 (FIG. 1). Alternatively, the dimension data can be wirelessly transmitted from the accessory 100 to the mobile device 102 over a personal area network (PAN), such as a Bluetooth network, using a radio interface 204 (FIG. 2).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for measuring a dimension described herein. The non-processor circuits may include, but are not limited to, a radio receiver, a radio transmitter, signal drivers, clock circuits, power source circuits, and user input devices. As such, these functions may be interpreted as steps of a method of measuring a dimension described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A mobile device accessory for measuring a dimension, comprising:
    a housing having a mating feature adapted to mate with a corresponding mating feature of a mobile device;
    a measuring tape comprising a detectable pattern thereon, the detectable pattern being related to the dimension;
    a detector configured to generate a signal in response to detecting the pattern;
    a processor configured to generate dimension data in response to receiving the signal; and
    an interface for transmitting the dimension data to the mobile device.

2. The mobile device accessory of claim 1, wherein the interface comprises a radio.

3. The mobile device accessory of claim 1, wherein the tape is retractable into a housing of the accessory.

4. The mobile device accessory of claim 1 further comprising a display for displaying the dimension data.

5. The mobile device accessory of claim 1 further comprising a memory for storing the dimension data.

6. The mobile device accessory of claim 1 further comprising a control button for activating the detector.

7. The mobile device accessory of claim 1 further comprising a mechanical lock for securing a position of the measuring tape.

8. The mobile device accessory of claim 1 further comprising a battery coupled to the processor.

9. The mobile device accessory of claim 1, wherein the interface comprises an electrical connector that mates with an electrical connector of the mobile device.

10. A method for measuring a dimension, comprising:
    positioning a measuring tape comprising a detectable pattern thereon on an object to be measured, the detectable pattern being related to the dimension;
    generating a signal in response to detecting the pattern;

processing the signal to generate dimension data; and transmitting the dimension data to a mobile device.

11. The method of claim 10, wherein the transmitting comprises wirelessly transmitting the dimension data to the mobile device.

12. The method of claim 10 further comprising retracting the measuring tape into a housing.

13. The method of claim 10 further comprising displaying the dimension data.

14. The method of claim 10 further comprising storing the dimension data.

15. The method of claim 10 further comprising activating a detector for detecting the pattern.

16. A mobile device accessory for measuring a dimension, comprising:

a housing having a mating feature adapted to mate with a corresponding mating feature of a mobile device;

a measuring tape comprising a detectable pattern thereon on an object to be measured, the detectable pattern being related to the dimension;

detecting means for generating a signal in response to detecting the pattern;

processing means for processing the signal to generate dimension data; and transmission means for wirelessly transmitting the dimension data to the mobile device.

17. The mobile device accessory of claim 16, wherein the transmission means comprises a radio.

18. The mobile device accessory of claim 16, wherein the measuring tape is retractable into a housing of the accessory.

19. The mobile device accessory of claim 16 further comprising a memory for storing the dimension data.

20. The mobile device accessory of claim 16 further comprising a control button for activating the detector.

\* \* \* \* \*